(12) United States Patent
Bhogal et al.

(10) Patent No.: US 8,086,996 B2
(45) Date of Patent: Dec. 27, 2011

(54) BINDING AN IMAGE DESCRIPTOR OF A GRAPHICAL OBJECT TO A TEXT DESCRIPTOR

(75) Inventors: Kulvir Singh Bhogal, Fort Worth, TX (US); Robert Ross Peterson, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 900 days.

(21) Appl. No.: 11/752,057

(22) Filed: May 22, 2007

(65) Prior Publication Data

US 2008/0295011 A1 Nov. 27, 2008

(51) Int. Cl.
*G06F 9/44* (2006.01)
*G06F 9/06* (2006.01)

(52) U.S. Cl. ........ 717/105; 715/744; 715/762; 715/765; 715/771; 717/109

(58) Field of Classification Search .................. 715/744, 715/762, 763, 764, 765, 766, 771, 792, 797; 717/105, 106, 109
See application file for complete search history.

(56) References Cited

U.S. PATENT DOCUMENTS

| | | | | |
|---|---|---|---|---|
| 5,999,948 A | * | 12/1999 | Nelson et al. | 715/207 |
| 6,167,411 A | * | 12/2000 | Narayanaswamy | 715/217 |
| 7,487,464 B2 | * | 2/2009 | Grotjohn et al. | 715/797 |
| 7,490,314 B2 | * | 2/2009 | Yuknewicz et al. | 717/105 |
| 7,546,543 B2 | * | 6/2009 | Louch et al. | 715/762 |
| 7,603,624 B2 | * | 10/2009 | Bent et al. | 715/744 |
| 7,620,907 B2 | * | 11/2009 | Resnick et al. | 715/771 |
| 2003/0071860 A1 | * | 4/2003 | Goddard et al. | 345/866 |
| 2003/0164859 A1 | * | 9/2003 | Evans | 345/792 |
| 2005/0076306 A1 | * | 4/2005 | Martin et al. | 715/747 |
| 2005/0193368 A1 | * | 9/2005 | Becker et al. | 717/106 |
| 2006/0206804 A1 | * | 9/2006 | Barnett | 715/513 |
| 2008/0263462 A1 | * | 10/2008 | Mayer-Ullmann et al. | 715/762 |

* cited by examiner

Primary Examiner — Nicholas Augustine
(74) Attorney, Agent, or Firm — Law Office of Jim Boice

(57) ABSTRACT

A computer-implementable method, system, and computer-readable medium for binding an image descriptor of a Graphical User Interface (GUI) widget to a text field are presented. The method includes associating an image descriptor, of the GUI widget, with a content of an active field in the text field, wherein the image descriptor of the GUI widget and the content of the active field in the text field are substantially similar. In response to the image descriptor of the GUI widget changing, the content of the active field in the text field is modified to represent the changed image descriptor of the GUI widget.

19 Claims, 8 Drawing Sheets

BINDING AN IMAGE DESCRIPTOR OF A GRAPHICAL OBJECT TO A TEXT DESCRIPTOR

BACKGROUND OF THE INVENTION

The present invention relates in general to the field of computers and other data processing systems, including hardware, software and processes. More particularly, the present invention pertains to automatically correlating a visual representation of a graphical object in a Graphical User Interface (GUI) with a written description of that graphical object.

A useful feature of a Graphical User Interface (GUI) is its ability to display graphical objects used with an application. These graphical objects may be displayed in a webpage, an application display (used by a program such as a graphing program, a spreadsheet, a word processor, etc.), an Integrated Development Environment (IDE), or any display used by software that displays graphical objects. For example, consider the GUI 102 shown in FIG. 1. GUI 102 includes a file navigation pane 104, which displays links to various files and subfiles. If a user wishes to search any of these files/subfiles, then the user utilizes a GUI widget 106, which is presented in the shape of a magnifying glass. Through the reading of a text field 108, the user is instructed to use the magnifying glass to search the files/subfiles. Note that the GUI widget 106 is identified as a "striped magnifying glass." If the visual appearance of the GUI widget 106 changes (e.g., from striped to checked, or colored, or shaded, etc., or from a magnifying glass to a question mark, an arrow, a star, etc.), then the instructions in the text field 108 will no longer make sense, since the GUI widget 106 is no longer a "striped magnifying glass."

SUMMARY OF THE INVENTION

To address the issue described above, presently disclosed are a computer-implementable method, system, and computer-readable medium for binding an image descriptor of a Graphical User Interface (GUI) widget to a text field. In one embodiment, the method includes associating an image descriptor, of the GUI widget, with a content of an active field in the text field, wherein the image descriptor of the GUI widget and the content of the active field in the text field are substantially similar. In response to the image descriptor of the GUI widget changing, the content of the active field in the text field is modified to represent the changed image descriptor of the GUI widget.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 2A:
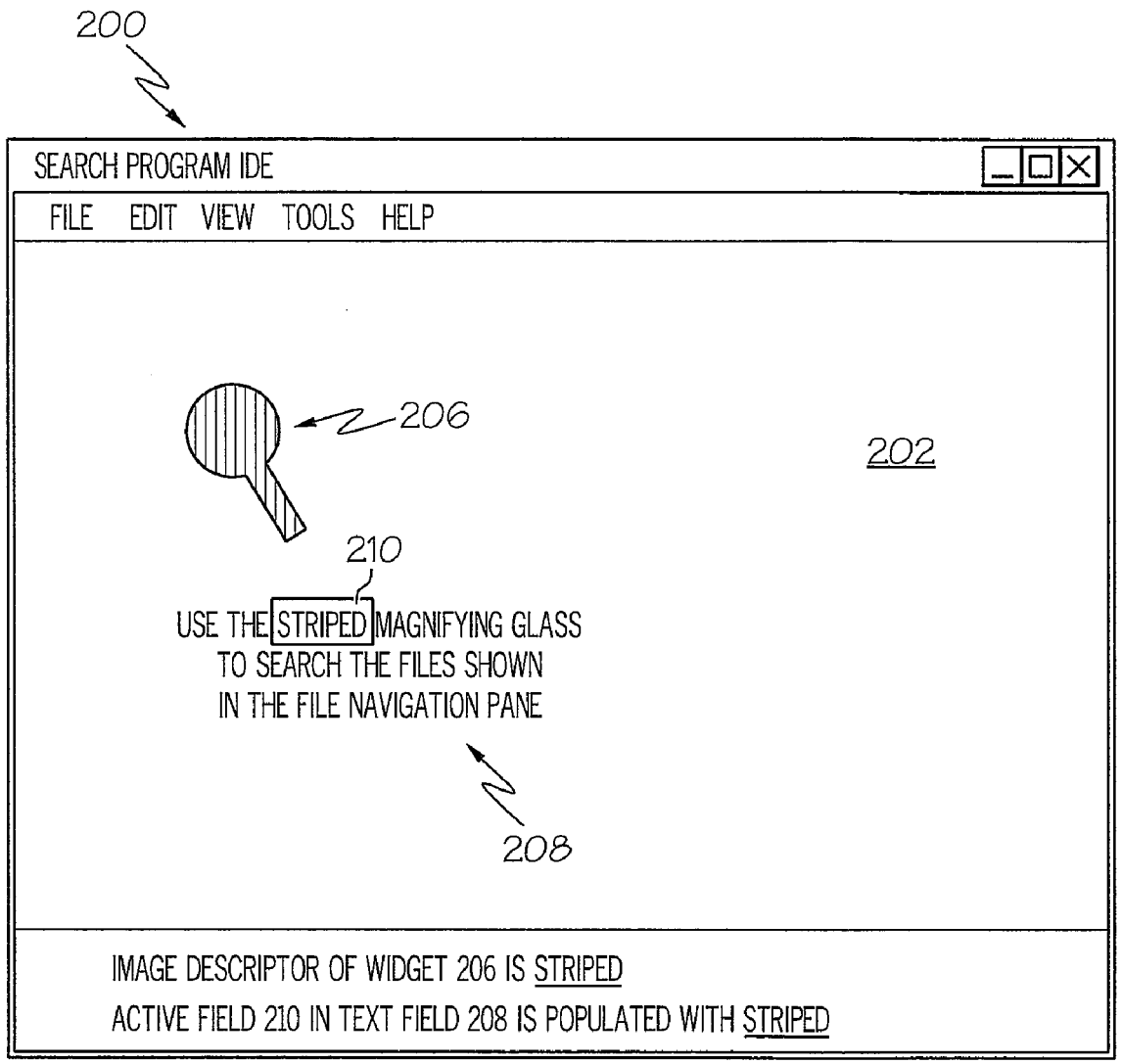
FIGS. 2A-B illustrates a novel Integrated Development Interface (IDE) in which a change to an image descriptor of a widget, or change to contents of a corresponding text box, results in a change to the respective image descriptor or text box.

With reference now to FIG. 2A, a GUI 200 for a search program Integrated Development Environment (IDE) is presented. As known to those skilled in the art of software development, an IDE is a type of computer software that aids in the development of software, and includes a source code editor, a compiler, build-automation tools, a canvas onto which components (including widgets) can be added, a properties window that describes features of components found in the canvas, and a debugger. For purposes of clarity, FIG. 2A only shows a canvas 202 and a properties window 204a from the search program IDE.

Figure 1:
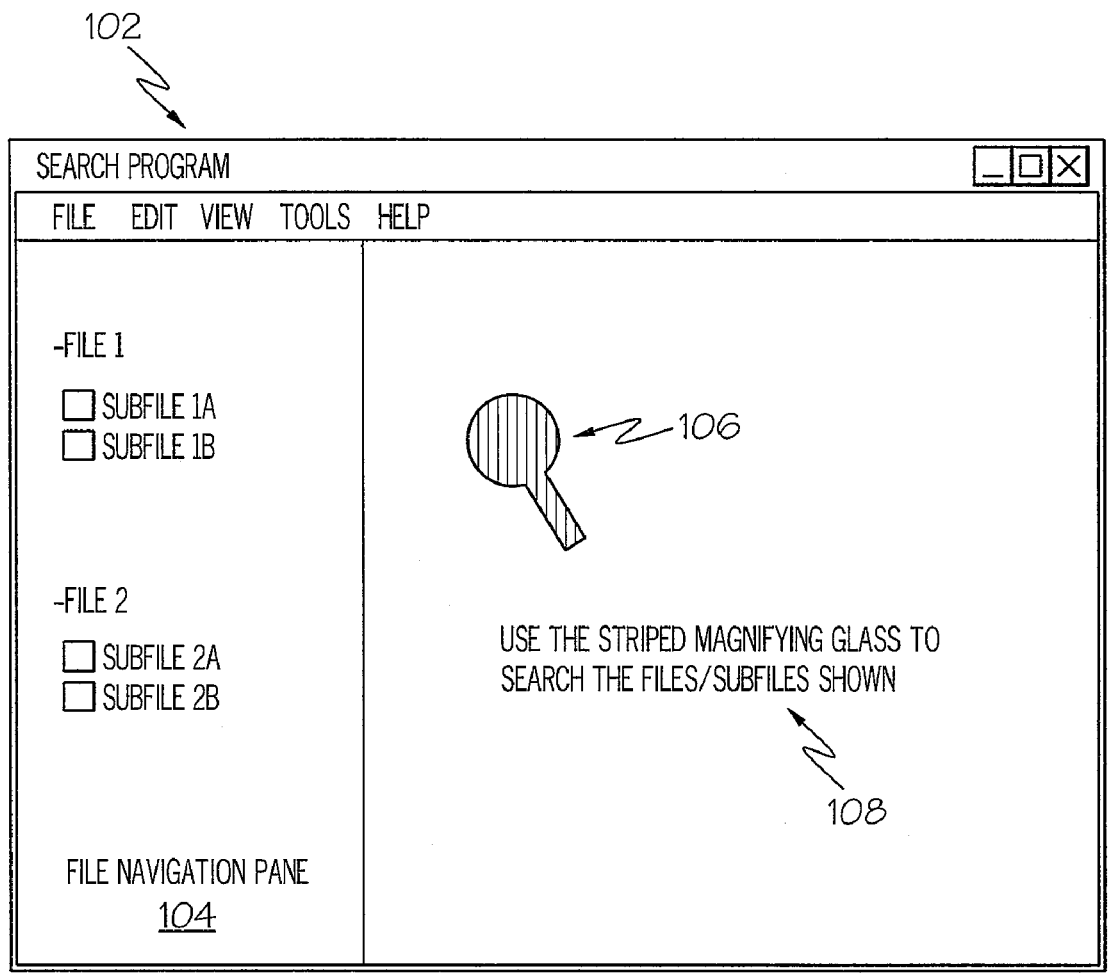
FIG. 1 depicts a prior art search program Graphical User Interface (GUI)
Figure 2B:
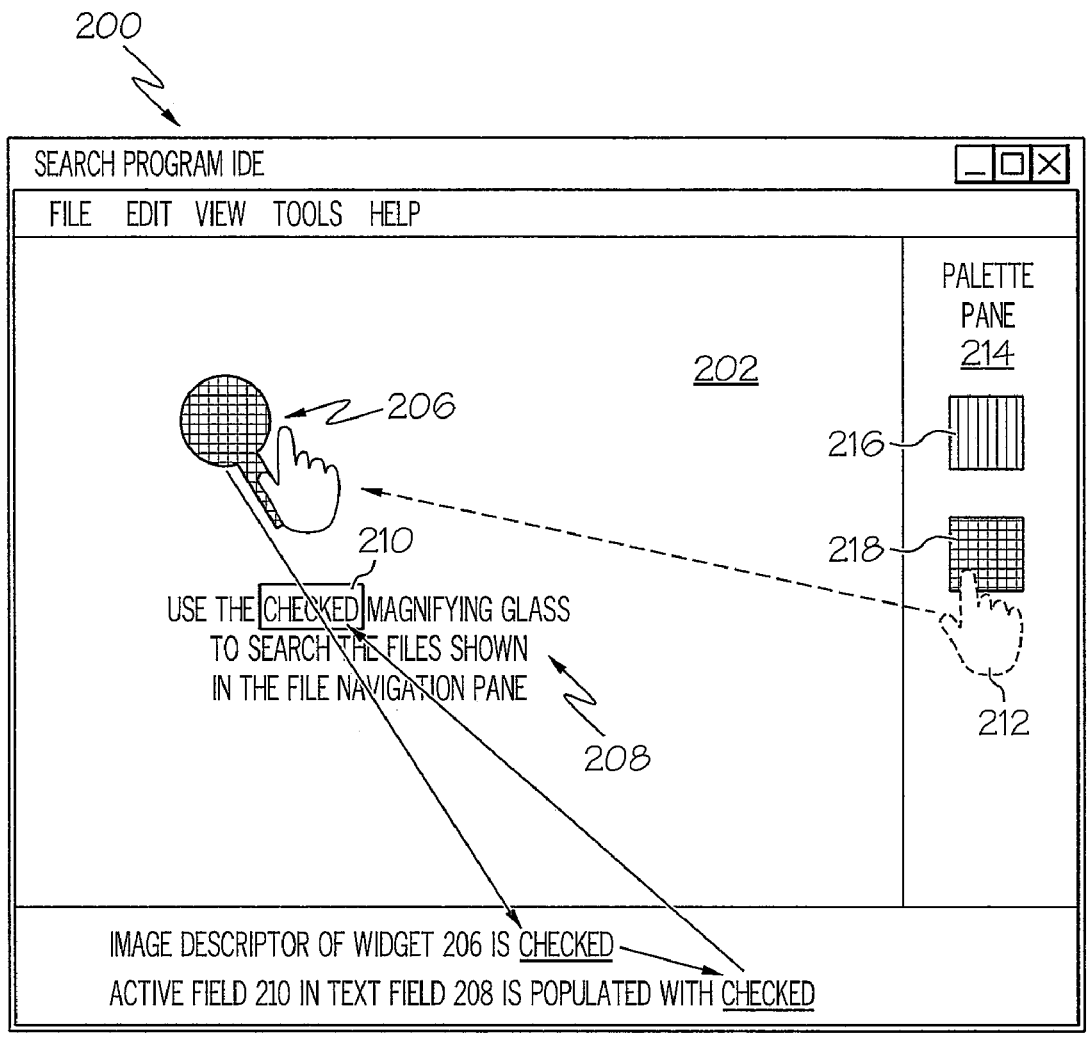

Within canvas 202 is a Graphical User Interface (GUI) widget 206. GUI widget 206 may represent and/or contain any underlying functionality logic/software, including that needed to perform a file search as describe above with FIG. 1. A description of how GUI widget 206 is to be used is supplied by text field 208, which includes an active field 210. Note that, initially, GUI widget 206 has a "striped" appearance. However, in FIG. 2B, the visual appearance of GUI widget 206 has changed to "checked." This occurred when the user of the IDE placed a cursor 212 over a palette pane 214, which includes fill effect icons for "striped" (icon 216) and "checked" (icon 218). That is, as depicted in FIG. 2B, the user of the IDE has now dragged the checked icon 218 over to the GUI widget 206 on the canvas 202. This caused multiple events to automatically occur.

Figure 3:
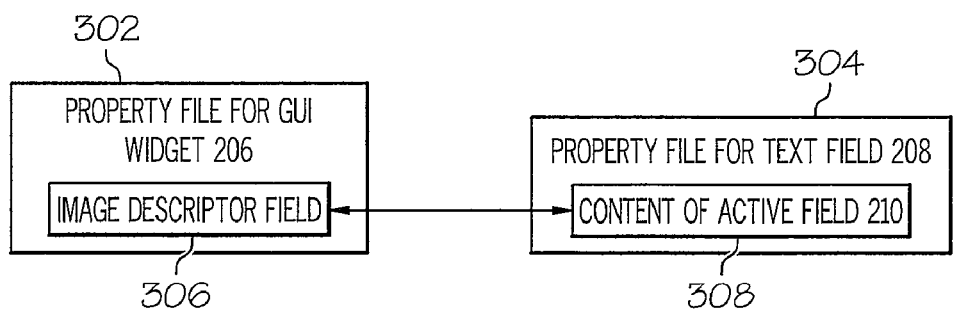
FIG. 3 depicts a file relationship between an image descriptor and contents of a corresponding text field.

First, as shown in the properties window 204b, metadata for GUI widget 206 that describes the image of the GUI widget 206 has automatically changed from "striped" (as shown in FIG. 2A) to "checked," as shown in the properties window 204b. Second, this metadata also changes the content of the active field 210 from "striped" to "checked," either directly or indirectly (as shown by an arrow link between properties in the properties window 204b), such that the text field 208 accurately describes the visual appearance of GUI widget 206. As shown in FIG. 3, this relationship is logically shown between a property file 302 (for GUI widget 206) and a property file 304 for text field 208. These property files may be simple metadata associated with the code that describes the respective widget and text field. Such code may be part of a header, a HyperText Metadata Language (HTML) file used by a webpage, an eXtensible Markup Language (XML) file, etc. Thus, part of property file 302 is an image descriptor field 306, which describes the visual image (e.g., "striped," "checked," "blue", "magnifying glass," etc.) of the GUI widget 206 (shown in FIG. 2A-B). That is, this description may be a color, a fill effect, a shape, or any other visual descriptor.

Linked to the image descriptor field 306 is the content 308 of active field 210 (shown in FIGS. 2A-B), which is a text descriptor shown in the text field 208 shown in FIG. 2A-B. The content of image descriptor field 306 and content 308 may be exactly the same. If the property files are database files, then they may be linked through a table, pointers, etc., which links database files that are substantially similar in spelling and/or meaning.

Figure 4A:
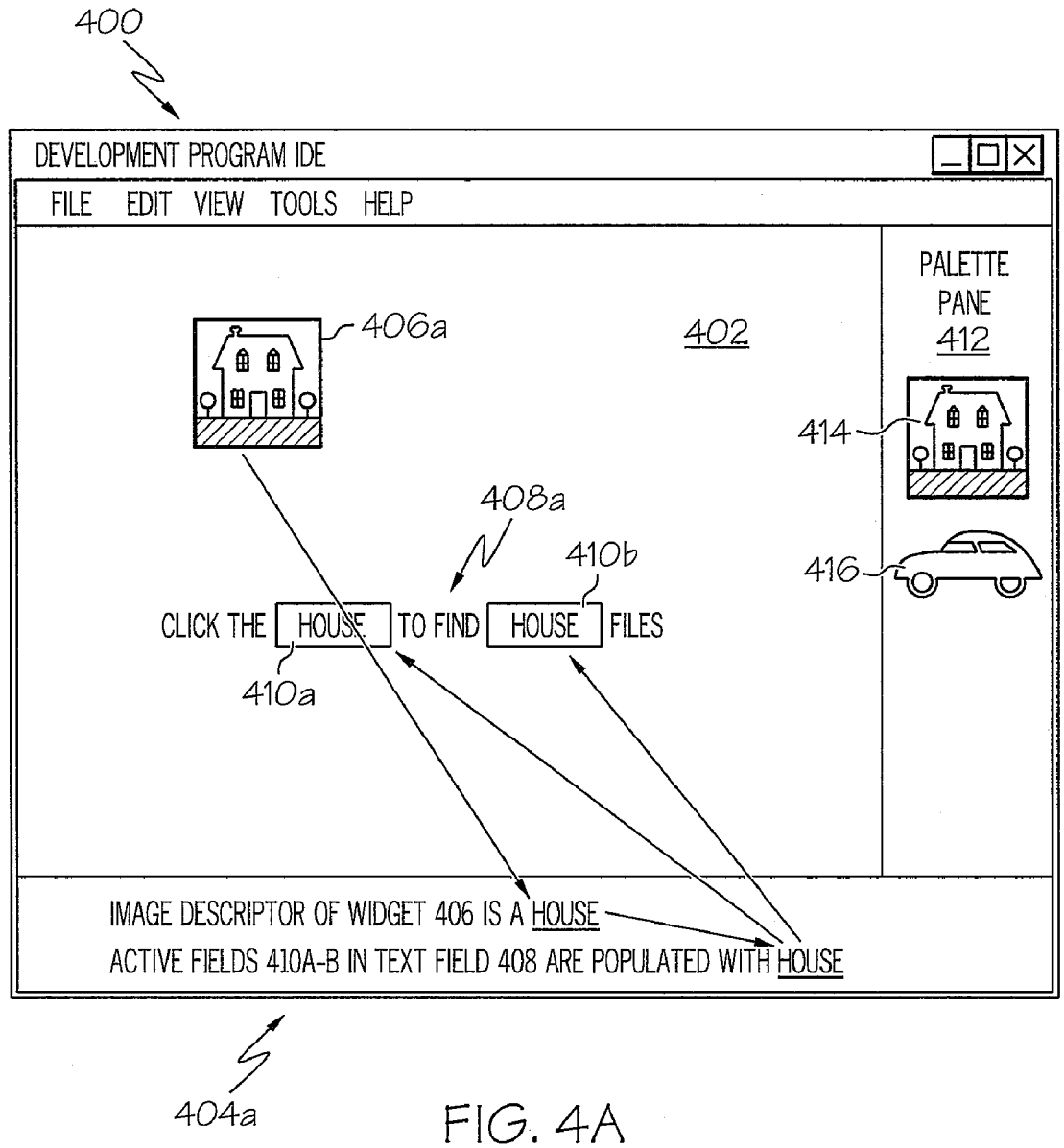
FIGS. 4A-B illustrates an IDE in which a change to the shape of the widget results in a change to the corresponding text box.
Figure 4B:
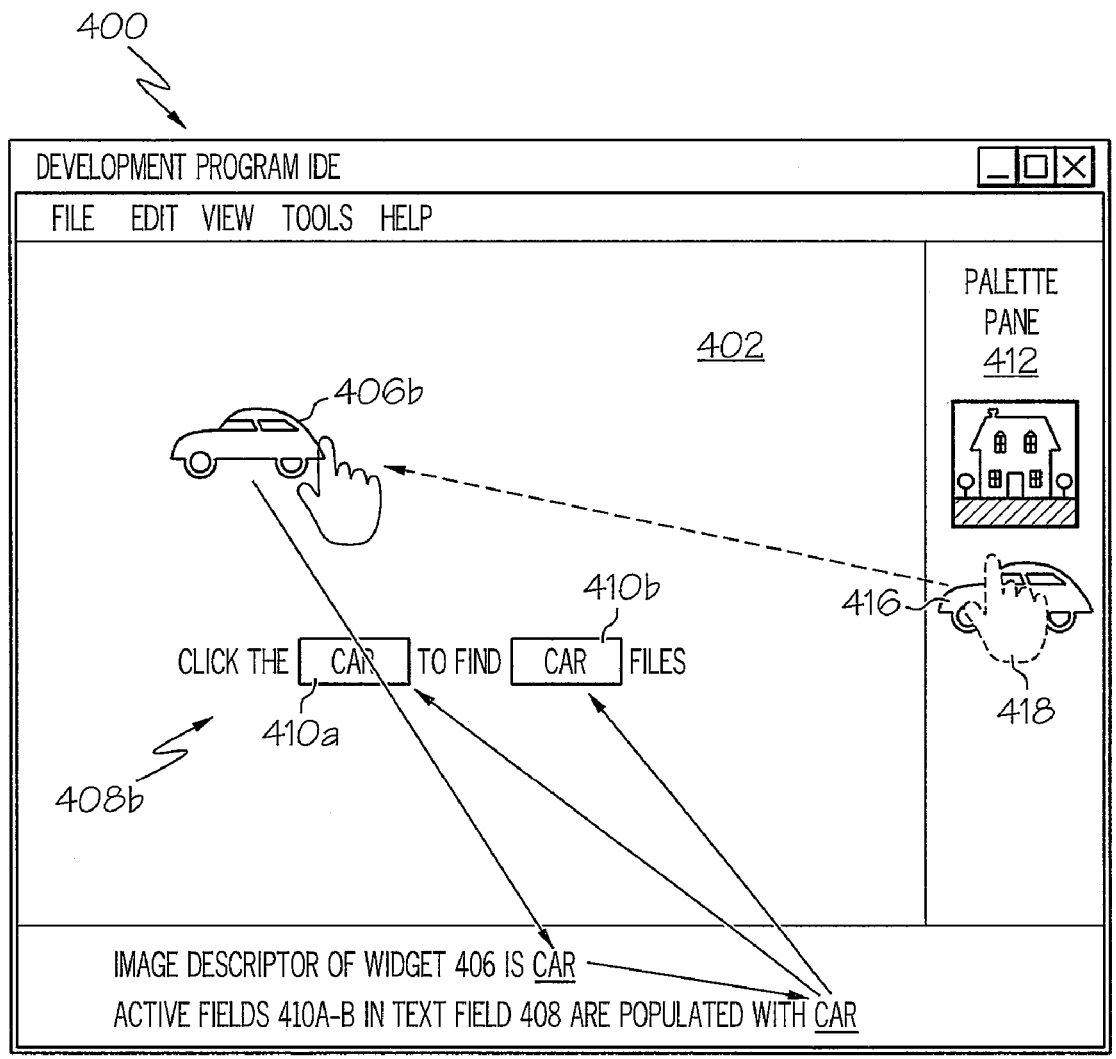

As suggested above, the visual representation of a GUI widget may change in color, shading or fill effect, or the visual representation may change to a completely different shape/image. For example, as shown in FIG. 4A, a GUI 400 for an IDE (which includes a canvas 402, a properties window 404a, and a palette pane 412) displays a GUI widget 406a and a text field 408a. Metadata associated the GUI widget 406a includes the metadata "house," which describes the image of the GUI widget 406a, and also populates the active files 410a-b of the text field 408a, in a manner similar to that described above with respect to FIGS. 2A-B and FIG. 3. Note that palette pane 412 includes icon 414 (for a house) and icon 416 (for a car). Thus, when icon 416 is dragged onto canvas 402 to replace the metadata features for GUI widget 406a (now GUI widget 406b), as shown in FIG. 4B, the new associated metadata automatically populates the active fields 410a-b for text field 408b. In a preferred embodiment, changing the appearance of GUI widget 406a to a car (GUI widget 406b) also automatically changes the underlying functionality associated with the GUI widget. That is, GUI widget 406a is used to find files related to a user's house, while GUI widget 406b enables logic used to find files that are related to the user's car.

Figure 5:
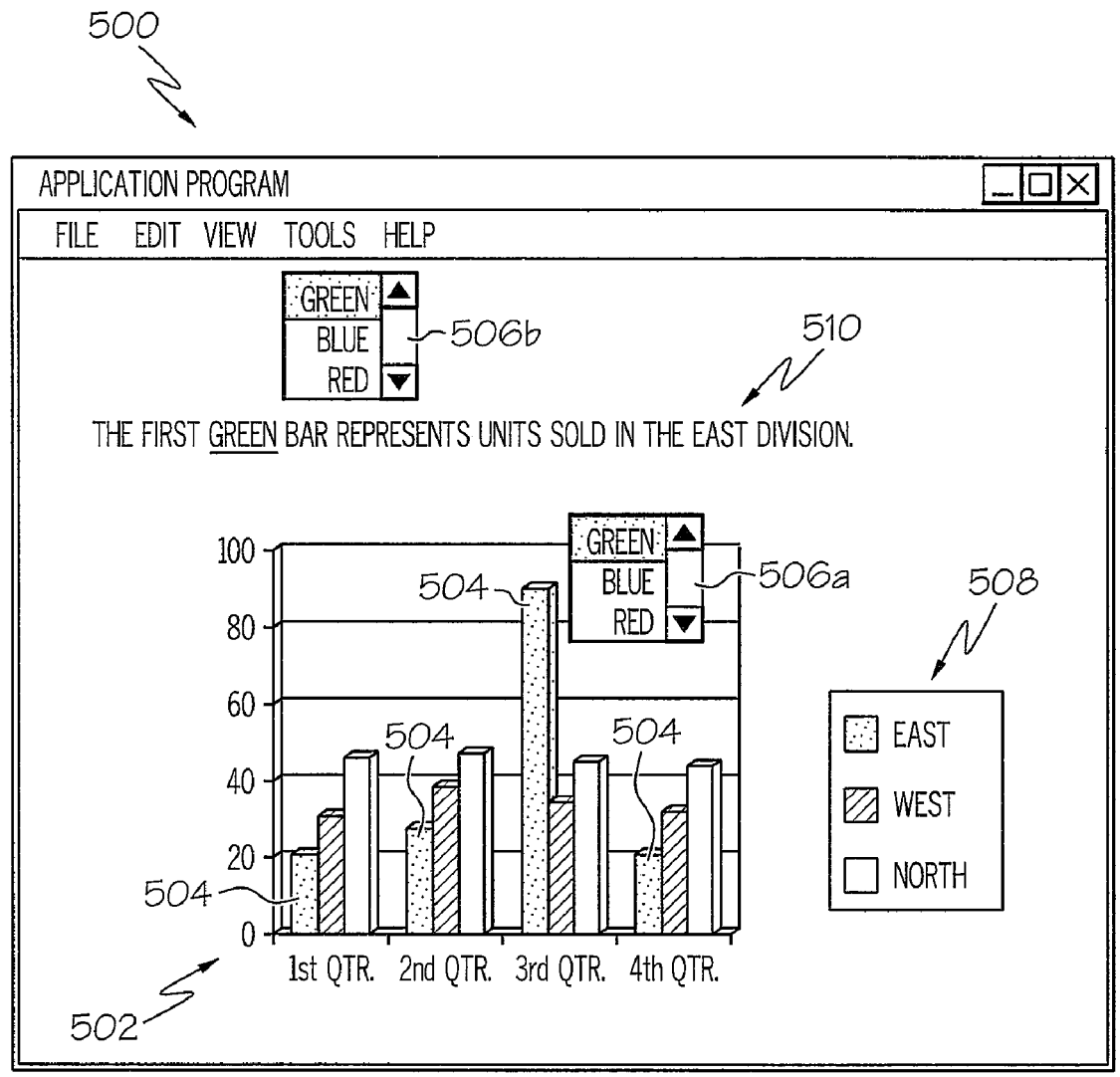
FIG. 5 depicts an application program GUI in which a user can make limited changes to a widget and the corresponding text box.

While the present process has been described in the context of an IDE during the development phase of software, note that the methodology described herein may also be utilized in a user application. For example, consider now the GUI 500 shown in FIG. 5. GUI 500 is for a user application, meaning that the application program has been developed by a programmer, and is now ready for use by an end-user. GUI 500 presents a graph 502, which is considered in the present disclosure as being another type of GUI widget. Graph 502 includes sets of bars that represent units sold in each annual quarter represented. Each set of bars includes a left-most bar 504 for the "East division." The left-most bars 504 in each quarter are initially colored green. However, by utilizing a drop-down menu 506a, a user can scroll down to and select (click) another color, which will cause metadata for each left-most bar 504 to change, thus causing the left-most bars' colors to also change (i.e., to blue or red). This step also causes the corresponding colors shown in the legend box 508 to change accordingly. Alternatively, the user can use the drop-down menu 506b to change the content of the text field 510, which will automatically cause the color of the left-most bars 504 and the colors in the legend 508 to change accordingly. These changes occur through metadata and/or file field linkage, such as described above in FIG. 3.

Figure 6:
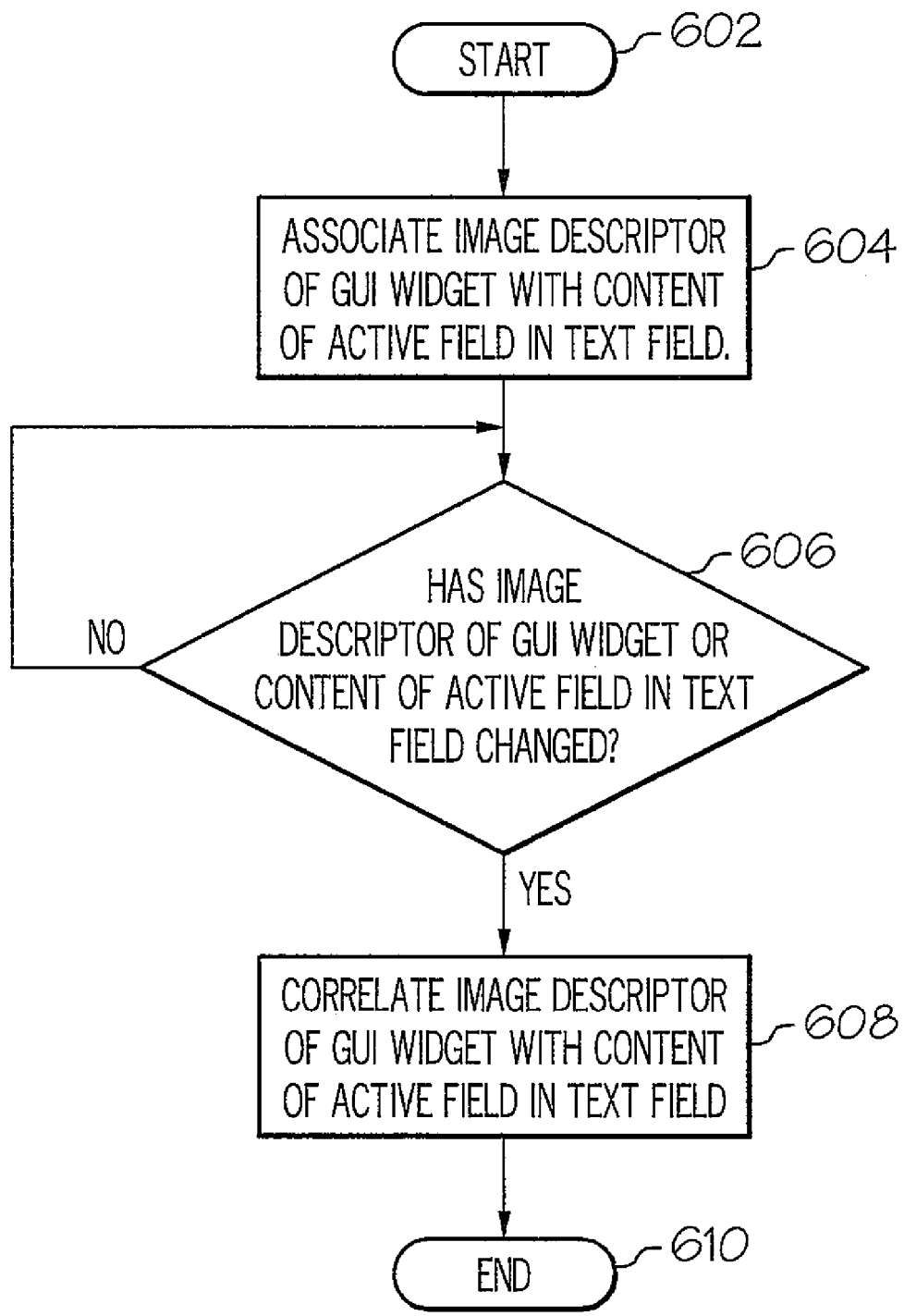
FIG. 6 is a flow-chart of exemplary steps taken to coordinate a widget's appearance and a text box that describes that appearance.

With reference now to FIG. 6, a flow-chart of exemplary steps taken by the present disclosure to correlate descriptors of graphical objects with text descriptions is presented. After initiator block 602, an image descriptor of a GUI widget is associated (e.g., linked) with a content of an active field in a text field, such as a text box displayed in a GUI (block 604). Thus, as described above in FIG. 3, these descriptors/content are linked in a logical manner such that if one changes, the other will also change accordingly. If either the visual appearance of the GUI widget or the text descriptor for the GUI widget changes (query block 606), then the corresponding text descriptor or GUI widget appearance also changes (block 608), and the process ends (terminator block 610). As described above, elements whose images can change include, but are not limited to, shapes, colors, fill effects or graphical images, while text fields comprise text boxes shown on a GUI. In an alternate embodiment, the content of the text fields may be content in a text document (not shown in the figures), which may be part of a program printout, a text file, or any other editable text document.

Figure 7:
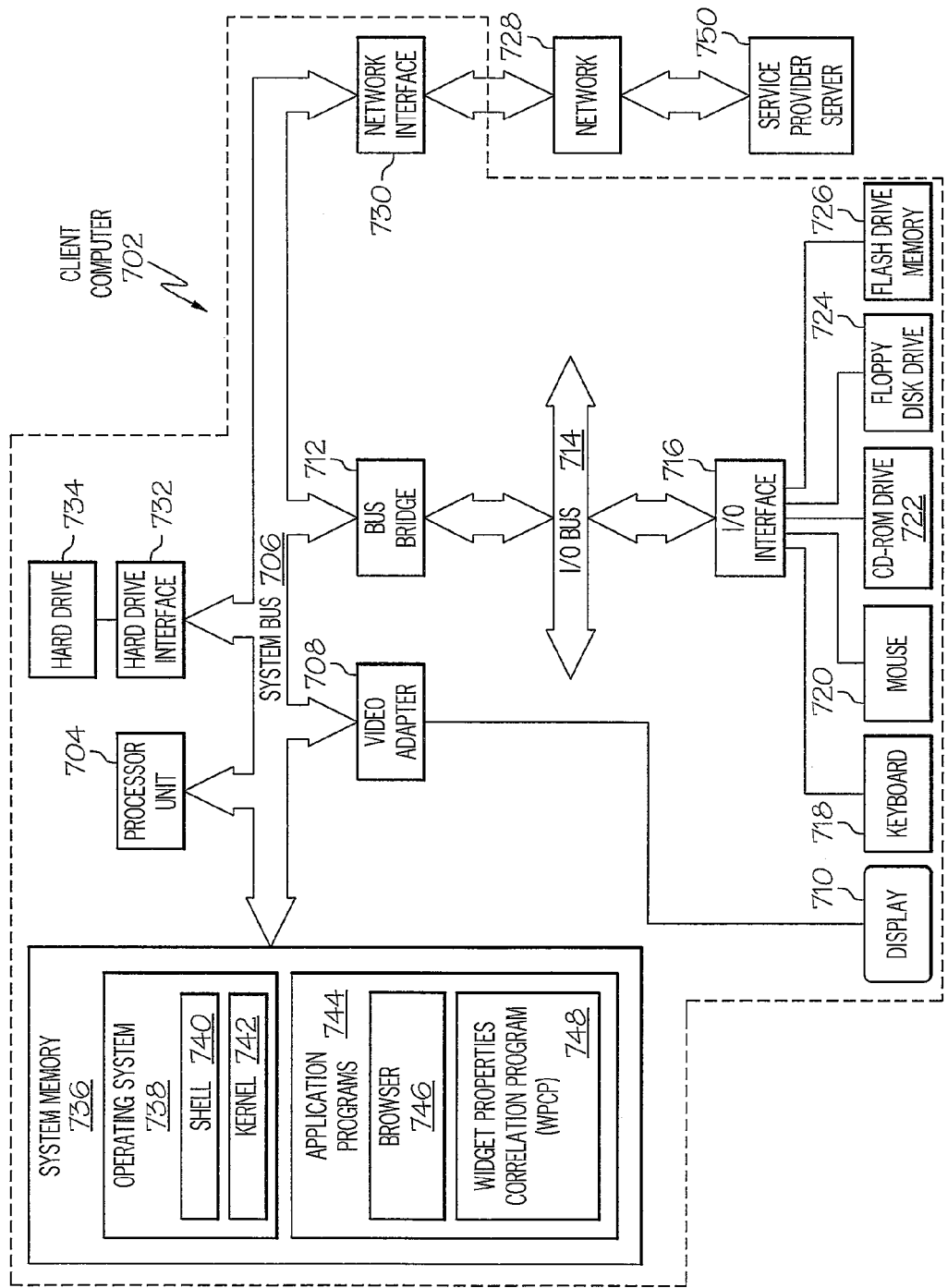
FIG. 7 depicts an exemplary computer in which the present invention may be implemented.

With reference now to FIG. 7, there is depicted a block diagram of an exemplary client computer 702, in which the present invention may be utilized. Client computer 702 includes a processor unit 704 that is coupled to a system bus 706. A video adapter 708, which drives/supports a display 710, on which GUI's described herein are displayed, is also coupled to system bus 706. System bus 706 is coupled via a bus bridge 712 to an Input/Output (I/O) bus 714. An I/O interface 716 is coupled to I/O bus 714. I/O interface 716 affords communication with various I/O devices, including a keyboard 718, a mouse 720, a Compact Disk-Read Only Memory (CD-ROM) drive 722, a floppy disk drive 724, and a flash drive memory 726. The format of the ports connected to I/O interface 716 may be any known to those skilled in the art of computer architecture, including but not limited to Universal Serial Bus (USB) ports.

Client computer 702 is able to communicate with a service provider server 750 via a network 728 using a network interface 730, which is coupled to system bus 706. Network 728 may be an external network such as the Internet, or an internal network such as an Ethernet or a Virtual Private Network (VPN).

A hard drive interface 732 is also coupled to system bus 706. Hard drive interface 732 interfaces with a hard drive 734. In a preferred embodiment, hard drive 734 populates a system memory 736, which is also coupled to system bus 706. System memory is defined as a lowest level of volatile memory in client computer 702. This volatile memory may include additional higher levels of volatile memory (not shown), including but not limited to cache memory, registers, and buffers. Data that populates system memory 736 includes client computer 702's operating system (OS) 738 and application programs 744.

OS 738 includes a shell 740, for providing transparent user access to resources such as application programs 744. Generally, shell 740 is a program that provides an interpreter and an interface between the user and the operating system. More specifically, shell 740 executes commands that are entered into a command line user interface or from a file. Thus, shell 740 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 742) for processing. Note that while shell 740 is a text-based, line-oriented user interface, the present invention will equally well support other user interface modes, such as graphical, voice, gestural, etc.

As depicted, OS 738 also includes kernel 742, which includes lower levels of functionality for OS 738, including providing essential services required by other parts of OS 738 and application programs 744, including memory management, process and task management, disk management, and mouse and keyboard management.

Application programs 744 include a browser 746. Browser 746 includes program modules and instructions enabling a World Wide Web (WWW) client (i.e., client computer 702) to send and receive network messages to the Internet using HyperText Transfer Protocol (HTTP) messaging, thus enabling communication with service provider server 750.

Application programs 744 in client computer 702's system memory also include a Widget Properties Correlation Program (WPCP) 748, which includes code for implementing the processes and Graphical User Interfaces (GUIs) described in FIGS. 2-6. Note that WPCP 748 includes code for detecting mouse clicks, cursor positioning, and other program and GUI monitoring to determine when a second application's GUI should populate insignificant real estate on a first application's GUI, in accordance with the process described above.

In one embodiment, client computer 702 is able to download WPCP 748 from service provider server 750, preferably in an "on demand" basis.

Note that the hardware architecture for service provider server 750 may be substantially similar to that shown for client computer 702.

The hardware elements depicted in client computer 702 are not intended to be exhaustive, but rather are representative to highlight essential components required by the present invention. For instance, client computer 702 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 750 performs all of the functions associated with the present invention (including execution of WPCP 748), thus freeing client computer 702 from using its own resources.

It should be understood that at least some aspects of the present invention may alternatively be implemented in a computer-useable medium that contains a program product. Programs defining functions of the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of WPCP 748, are performed by service provider server 750. Alternatively, WPCP 748 can be deployed as software from service provider server 750 to client computer 702. This deployment may be performed in an "on demand" basis manner, in which WPCP 748 is only deployed when needed by client computer 702. In another embodiment, process software for the method so described may be deployed to service provider server 750 by another service provider server (not shown).

As described herein, presently presented are a computer-implementable method, system, and computer-readable medium for binding an image descriptor of a Graphical User Interface (GUI) widget to a text field. In one embodiment, the method includes the steps of associating an image descriptor, of the GUI widget, with a content of an active field in the text field, wherein the image descriptor of the GUI widget and the content of the active field in the text field are substantially similar; and in response to the image descriptor of the GUI widget changing, modifying the content of the active field in the text field to represent the changed image descriptor of the GUI widget.

In another embodiment, a change to the content of the active field in the text field causes the image descriptor, and thus the appearance, of the GUI widget to change. The GUI widget may change in appearance according to color, shading, fill effect, etc. Alternatively, the appearance of the GUI widget may change from one geometric or representational shape to another shape.

When a change occurs to the GUI widget on one GUI, the same change occurs in other GUIs wherever the GUI widget occurs. These changes may be in an Integrated Development Environment (IDE), or they may be performed in a user application IDE. If the change occurs in a user application IDE, then in a preferred embodiment, the user can only make changes that are presented as options in a drop-down or similar type of menu.

While the present invention has been particularly shown and described with reference to a preferred embodiment, it will be understood by those skilled in the art that various changes in form and detail may be made therein without departing from the spirit and scope of the invention. For example, the present invention has been described and claimed with reference to "widgets," which are understood to be a GUI interface element with which a user interacts to cause/create some action by the computer. However, the scope of the invention and claims is understood to include other GUI elements, including graphs, pictures, and other graphical elements. When a change to the visual appearance of such a graphical GUI element changes, then the associated text descriptor changes in the manner described above. Similarly, when a text descriptor changes, the appearance of the associated graphical GUI element likewise changes.

Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer implemented method for binding an image descriptor of a Graphical User Interface (GUI) widget to a text field, the computer implemented method comprising:
    associating an image descriptor, of the GUI widget, with a content of an active field in the text field, wherein the image descriptor of the GUI widget and the content of the active field in the text field are substantially similar, and wherein the GUI widget and the text field are both displayed on a GUI; and
    in response to the image descriptor of the GUI widget changing, a processor automatically modifying the content of the active field in the text field and changing an appearance of the GUI widget to represent the changed image descriptor of the GUI widget.

2. The computer implemented method of claim 1, wherein changing the image descriptor of the GUI widget changes an appearance of the GUI widget from a first shape to a second shape.

3. The computer implemented method of claim 1, wherein changing the image descriptor of the GUI widget changes an appearance of the GUI widget from a first color to a second color.

4. The computer implemented method of claim 1, wherein the image descriptor and the content of the active field are identical.

5. The computer implemented method of claim 1, wherein the GUI widget and the text field are displayed on a same window of the GUI.

6. The computer implemented method of claim 1, wherein the GUI widget and the text field are both displayed in a first GUI and a second GUI, and wherein a change to the image descriptor of the GUI widget and an associated content of the active field in the text field changes the GUI widget's appearance and an associated text field in both the first GUI and the second GUI.

7. The computer implemented method of claim 1, wherein the GUI widget and the text field are displayed in a GUI of an Integrated Development Environment (IDE).

8. The computer implemented method of claim 1, wherein the GUI widget and the text field are displayed in a GUI used by an application program, and wherein only the image descriptor of the GUI widget and the content of an associated active field in the text field are editable by a user.

9. The computer implemented method of claim 8, wherein the image descriptor of the GUI widget and the associated active field are editable by a user selecting the image descriptor from a drop-down menu in a pop-up window that is displayed in the GUI.

10. A computer implemented method for binding an image descriptor of a Graphical User Interface (GUI) widget to a text field, the computer implemented method comprising:
    associating an image descriptor, of the GUI widget, with a content of an active field in the text field, wherein the image descriptor of the GUI widget and the active field in the text field are substantially similar, and wherein the GUI widget and the text field are both displayed on a GUI; and
    in response to the content of the active field in the text field changing, a processor automatically modifying the image descriptor of the GUI widget and changing an appearance of the GUI widget to reflect the changed content of the active field in the text field.

11. The computer implemented method of claim 10, wherein changing the content of the active field in the text field results in a change to an appearance of the GUI widget from a first shape to a second shape.

12. The computer implemented method of claim 10, wherein changing the content of the active field in the text field results in a change to an appearance of the GUI widget from a first color to a second color.

13. The computer implemented method of claim 10, wherein the image descriptor and the contents of the active field are identical.

14. The computer implemented method of claim 10, wherein the GUI widget and the text field are both displayed in a first GUI and a second GUI, and wherein a change to the image descriptor of the GUI widget and an associated content of the active field in the text field changes the GUI widget's appearance and the associated text field in both the first GUI and the second GUI.

15. A computer-readable storage device encoded with a computer program, the computer program comprising computer executable instructions configured for:
    associating an image descriptor, of the GUI widget, with a content of an active field in the text field, wherein the image descriptor of the GUI widget and the content of the active field in the text field are substantially similar, and wherein the GUI widget and the text field are both displayed on a GUI; and
    in response to the image descriptor of the GUI widget changing, automatically modifying the content of the active field in the text field and changing an appearance of the GUI widget to represent the changed image descriptor of the GUI widget.

16. The computer-readable storage device of claim 15, wherein the computer executable instructions are configured such that changing the content of the active field in the text field results in a change to an appearance of the GUI widget from a first shape to a second shape.

17. The computer-readable storage device of claim 15, wherein the computer executable instructions are configured such that the GUI widget and text field are both displayed in a first GUI and a second GUI, and wherein a change to the image descriptor of the GUI widget and the content of an associated active field in the text field changes the GUI widget's appearance and the associated text field in both the first GUI and the second GUI.

18. The computer-readable storage device of claim 15, wherein the computer-usable medium is a component of a remote server, and wherein the computer executable instructions are deployable to a supervisory computer from the remote server.

19. The computer-readable storage device of claim 15, wherein the computer executable instructions are capable of being provided by a service provider to a customer on an on-demand basis.

* * * * *